7714X
G. Page,
Wood Chisel.
Patented Aug. 14, 1833.
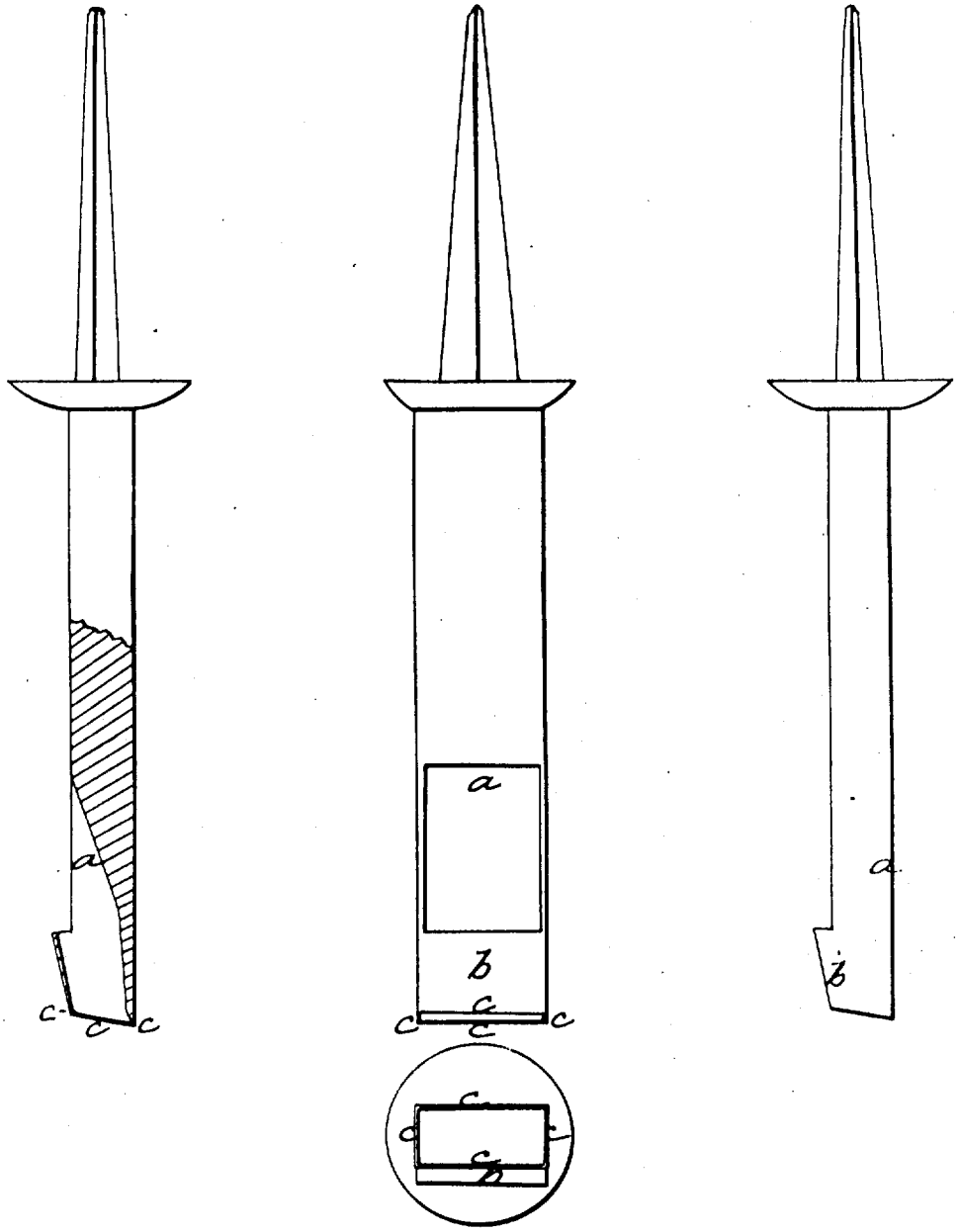
AM. PHOTO-LITHO CO. N.Y. (O'ROURKE'S PROCESS)

77144X Aug 14 1833 Aug 14, 1833 265

George Page
Letters Patent

The Schedule referred to in these Letters Patent and making part of the same, con-
taining a description in the words of the said George Page himself of his
improvement called the cutting and clearing chisel The improved chisel, which is called a cutting and clearing chisel is described
as follows. - The lower or cutting end of the chisel in other respects resem-
bles a common chisel, is made in the shape of a box open at top and bottom
with four sides, the angles being right angles and ~~and~~ the main body of
the chisel constituting one side of the box. The box is on the bevelled
side, of the main part of the chisel. The inner width of this box at
the ~~lower part of~~ it measuring from the edge of the main part of the chis
el to the opposite edge is in all cases about three sixteenths of an inch
and should gradually increase to the top. Its dimension the other way
or its longitudinal dimension is according to the size or width of the chis
el. Supposing the chisel to stand upright, the lower edges are not hor-
izontal, but that which is the end of the main part of the chisel, is
about one tenth of an inch lower than the opposite edge, and the two
side edges have a regular slope or slant from one of the before mentioned
edges to the other so that the first mentioned edge goes forward in cutting
the mortise and the two side edges follow, and trim the sides of it.
The sides of the box should be [illegible] strength
The height of the three short sides of the box should be from one half to three
quarters of an inch. - The box being larger one way that is to say wider at
the top than at the bottom. It holds the chip first cut until it is driven
up and out of the box by those cut afterwards. The edges of the sides of the
box are made sharp. The main edge which goes forward in cutting and
the two side edges are bevelled on the inside. The edges should be made of
steel and the three cutting edges spring tempered. The cutting and clearing
chisel is designed to be used principally in machines for making mortises.
when the mortise is to be made in hard wood, one hole should be bored, the
diameter of which must be the same as the width of the chisel, and the
mortise is to be cut to the left or right as may be most convenient about one

7714X eighth of an inch at a stroke the face of the chisel going forward until it comes
to the head of the mortice, The chisel is then turned and the mortice is cut in
the same manner to the other head of it. When the mortice is to be made in soft
wood, no hole need be bored, but if the machine is so contrived as to admit of
it, the mortice may be begun near one end of it and the cuts shallow at first
may be made deeper and deeper until the desired depth is obtained and
the chisel afterwards turned and the first end finished. This chisel may
also be used in trimming the heads and corners of all mortices however made.

I claim as my invention the addition of a fourth edge, or in other
words that side of the box before described which is opposite to the main
part of the chisel, and serves as a support to the side_edges.

Exd Witnesses
[illegible] John Hatch }
S Hale }

George Page (588 Words)

(Granted August 14, 1833.)